United States Patent [19]
Collette et al.

[11] Patent Number: 5,411,699
[45] Date of Patent: * May 2, 1995

[54] MODULAR MOLD

[75] Inventors: Wayne N. Collette, Merrimack; David P. Piccioli, Auburn; Suppayan M. Krishnakumar, Nashua, all of N.H.

[73] Assignee: Continental PET Technologies, Inc., Florence, Ky.

[ * ] Notice: The portion of the term of this patent subsequent to Oct. 26, 2010 has been disclaimed.

[21] Appl. No.: 86,103

[22] Filed: Jul. 2, 1993

Related U.S. Application Data

[63] Continuation of Ser. No. 792,449, Nov. 15, 1991, Pat. No. 5,255,889.

[51] Int. Cl.⁶ ............... B29C 33/30; B29C 49/48
[52] U.S. Cl. .................... 264/523; 264/537; 249/102; 249/155; 425/183; 425/195; 425/522; 425/525
[58] Field of Search ............ 264/523, 529, 534, 537, 264/540; 249/82, 102, 103, 104, 155; 425/183, 185, 190, 192 R, 195, 522, 525, 532, 533

[56] References Cited

U.S. PATENT DOCUMENTS

| | | | |
|---|---|---|---|
| 1,881,088 | 10/1932 | Matuschka | 249/102 |
| 3,354,509 | 11/1967 | Ammondson | 249/103 |
| 3,380,121 | 4/1968 | Chittenden et al. | 249/104 |
| 3,640,672 | 2/1972 | Starr | 264/534 |
| 3,914,101 | 10/1975 | Stefanka | 264/534 |
| 4,072,456 | 2/1978 | Appel et al. | 425/183 |
| 4,151,976 | 5/1979 | Schurman | 249/102 |
| 4,330,248 | 5/1982 | Platte | 249/102 |
| 4,815,960 | 3/1989 | Rudolph | 425/522 |
| 4,871,507 | 10/1989 | Ajmera | 264/529 |
| 4,884,961 | 12/1989 | Iizuka et al. | 249/104 |
| 5,122,327 | 6/1992 | Spina et al. | 264/534 |

FOREIGN PATENT DOCUMENTS

| | | | |
|---|---|---|---|
| 62-001514 | 1/1987 | Japan | 264/523 |
| 63-202425 | 8/1988 | Japan | 425/522 |

Primary Examiner—Catherine Timm
Attorney, Agent, or Firm—Wolf, Greenfield & Sacks

[57] ABSTRACT

An improved modular mold having adjustable height shims provided between upper and lower panel sections to adjust the volume and height of a PET beverage bottle. The shims are easily replaced and form part of a high-strength mold set which accepts customized shoulder and base portions.

4 Claims, 4 Drawing Sheets

MODULAR MOLD

This application is a continuation of application Ser. No. 07/792,499, filed Nov. 15, 1991, issued as U.S. Pat. No. 5,255,889.

BACKGROUND OF THE INVENTION

The present invention concerns modular molds for making containers, and more particularly to modular molds for making a hot-fill bottle which allows height and volume adjustments without requiring metal modifications of the mold sections.

A container, such as a biaxially-oriented PET beverage bottle, may be adapted to receive a hot-fill product with a minimum of thermal shrinkage and distortion. However, the bottle making and filling processes include many parameters which affect the product volume in the finished container. Thus, the final fill volume can be a function of: the metal dimensions of the blow mold, the mold process time, the mold operating temperature, the preform/bottle material distribution, the bottle age and storage conditions prior to filling (e.g., time, temperature, etc.), the filling line speed, the product fill temperature, the product fill pressure, and the time spent between the filler, capper and spray cooler. Changing any one of these parameters may have a significant effect on the final product volume, which is strictly controlled on the minimum side in order to comply with government labeling requirements and on the maximum side to avoid the undue expense of overfilling with excess product.

It would be desirable, everytime a bottle making or filling process parameter is changed, to avoid machining new mold pieces in order to achieve the desired fill volume. In addition, it would be desirable to make custom bottles for different product lines without having to completely redesign the mold.

It is known to split a bottle-making mold above and below the vacuum panel section for making a bottle of the type described in U.S. Pat. No. 4,863,046 entitled "Hot Fill Container," which issued Sep. 5, 1989 to Collette et al. In the known mold, a removable shoulder section provides custom flexibility above the label panel, and a shim is provided for varying the height (and thus the volume of the bottle) of the lower glue land—a cylindrical section located below the vacuum panels and above the base and to which adhesive is applied for attaching the label. However, this creates a glue land imbalance (since the upper glue land is not similarly extended) which may hinder a smooth attachment of the label, and the allowable height of the shim is severely limited by this glue land imbalance as well as by the required height of the vacuum panels. Increasing the bottle height without a similar increase to the height of the vacuum panel results in excess bottle vacuum as the product cools (and contracts) and the risk of vacuum collapse. Thus, the volume and height adjustability with this known modular mold is quite limited.

It is an object of this invention to provide an improved modular mold which solves the foregoing problems.

SUMMARY OF THE INVENTION

The improved modular mold of this invention provides volume and height adjustability in the molded container and is particularly useful for making bottles for a hot-fill product. The mold is constructed of three mold members, with mirror-image right and left upper mold members and a unitary base member. Each of the two upper mold members includes a central connecting member to which the removable mold sections are attachable. The central connecting member receives a neck finish plate and customized shoulder section from above, and one or more shims, lower panel section and base receiving sections from below.

The one or more shims are thus positioned between the upper and lower panel sections and define part of the vacuum panels. By adjusting the number or height of the shims, the manufacturer can easily and incrementally adjust the height and final volume of the bottle. Changing shims is a simple matter of loosening the lower bolts which hold the lower panel and base receiving sections to the central connecting member, replacing the shims, reinserting the lower mold sections and tightening the bolts. No machining of new parts is required.

Furthermore, because of the relatively large height of the vacuum panel area and because there is no loss of symmetry by the addition of more shims, the height/volume adjustability is extensive. For a 64 ounce PET beverage bottle, having a total bottle height of about 270 mm and a vacuum panel height of about 100 mm, a shim height range of up to 20 mm or more is possible while still maintaining a rigid and high-strength mold. Generally, the filling machines can accommodate this height change in the bottles. The mold strength is preserved by maintaining an extensive upper panel section as part of the central connecting member to which the other mold pieces are bolted; preferably the upper panel section is at least half of the vacuum panel height (about 50 mm or more in the previous example). In contrast, the prior art mold having a shim in the lower glue land was generally limited to a maximum 5 mm height adjustment and created an imbalance between the upper and lower glue lands. Even the addition of a second shim in the upper glue land, to correct the imbalance, would increase the height adjustment only a limited amount and be impractical because the multiple mold sections required would be expensive and greatly reduce the mold strength.

The height/volume adjustability is particularly useful any time there is a modification in the bottle making or filling processes which would affect the dimensions of the hot-fill bottle. Also, the height/volume adjustability enables the manufacturer to provide customized shoulder and/or base sections to make different size or shape bottles, without having to design a new mold. Thus, a 64 ounce bottle can be changed to a 2 liter bottle simply by changing the shim height from say 8 mm to 16 mm in the previous example. Also, providing different stylized shoulder and/or base sections, which changes may substantially alter the volume of the bottle, can be compensated for by changing the height of the vacuum panel section with shims, thus enabling the manufacturer to produce differently shaped bottles for two different customers, but having the same volume (e.g., each 64 ounce), while using the same basic mold set.

Another advantage of providing the shim in the center of the vacuum panel region is that as the bottle size increases the manufacturer can increase the vacuum panel region in order to offset the additional vacuum contraction (during cooling) of the product in the larger bottle.

DETAILED DESCRIPTION

The preferred mold apparatus described herein is adapted for making a hot-fill PET (polyethylene terephthalate) beverage bottle of the type described in U.S. Pat. No. 4,863,046 entitled "Hot Fill Container," which issued Sep. 5, 1989 to Collette et al. and which is hereby incorporated by reference in its entirety.

Figure 1:
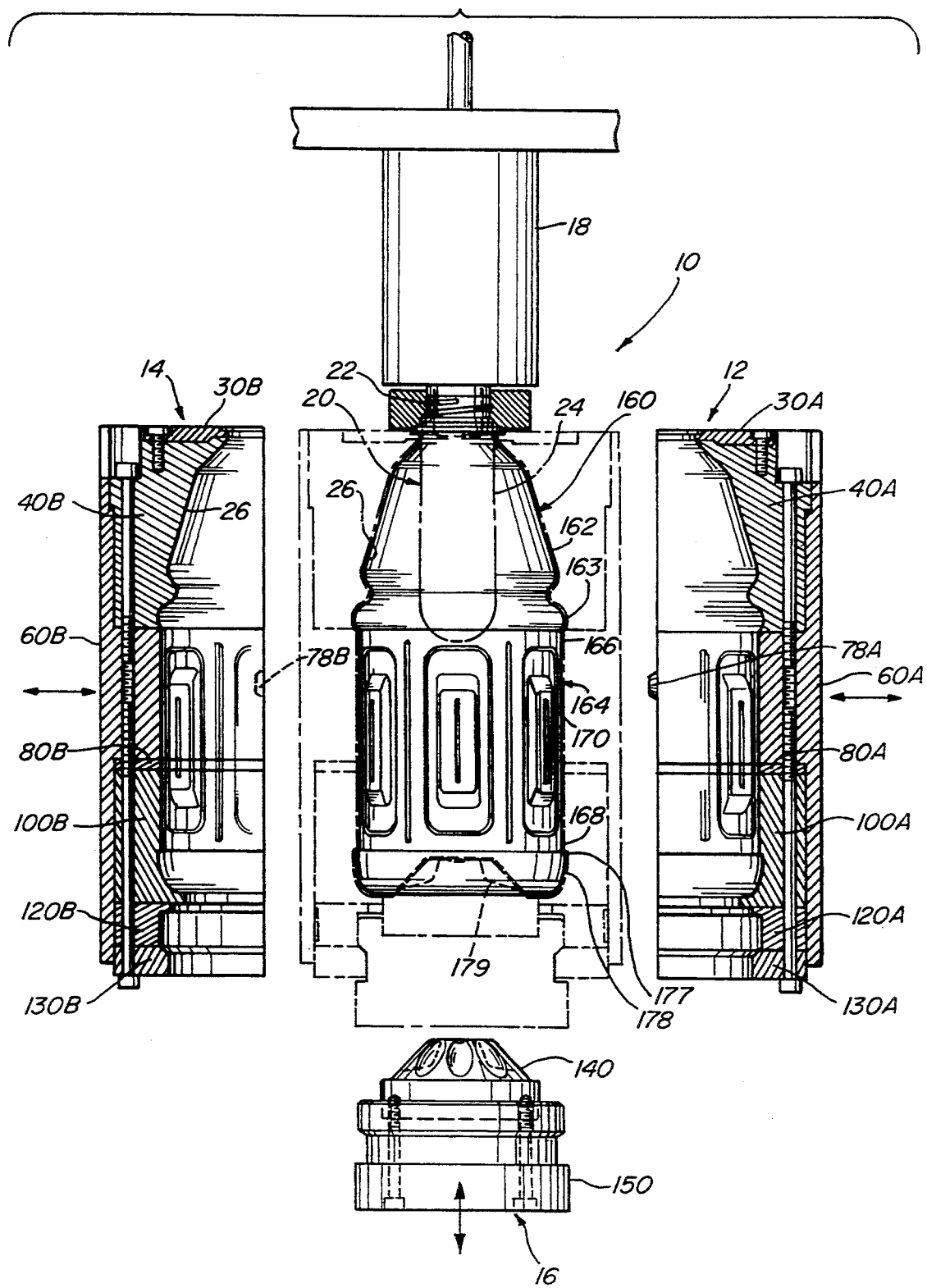
FIG. 1 is a schematic view, partially in section, of a formed bottle and the three separated mold members, with both the parison and closed mold members shown in phantom.

The bottle, as shown in FIG. 1 (bottle 160) and described in the Collette patent, is made from a preform 20 having a thread finish 22, attached to carrier 18, and a lower tube portion 24 which is blown into a bottle shape in a mold 10. During blowing, the preform assumes the shape of the interior molding surface 26 of the mold, to form: a) an upper shoulder portion 162; b) a middle label panel portion 164, which includes an upper glue land 166, vacuum panel region 170, and lower glue land 168; and c) a base 178. The upper shoulder 162 flares radially outwardly from the relatively narrow diameter neck of the thread finish 22 to the label panel 164, and includes a bumper 163 of greater diameter than the label panel 164 in order to protect the attached label 174 during shipment and storage. The base 178 also includes an enlarged diameter bumper 177 to protect the label and a recessed closed bottom 179. The vacuum panels 170 may take different forms, as shown in FIG. 1 herein or the Collette patent, but generally include a plurality of vertically elongated recesses and reinforcing ribs. The upper and lower glue lands are cylindrical bands which, along with portions of the vacuum panels, form the label area on which the label rests.

The modular mold of this invention, as shown in FIG. 1, has three movable mold members 12, 14, 16 which come together as indicated by the arrows to form the closed mold shown in phantom around preform 20. The upper right and left half members 12, 14 respectively are mirror images and move horizontally to close, with right retaining member 78A engaging left retaining member 78B. For ease of understanding, the mirror image components of the right and left members have been labeled A and B respectively. The third mold member is a unitary base member 16 which moves vertically to fit within a base receiving portion of the members 12, 14.

As shown in FIG. 1, the mold members 12, 14 each include a central fixed connecting member 60A, 60B which forms an outer rectangular housing of the mold set (see FIG. 3), and to which the other mold sections are attached with bolts. The members 60A, 60B each have an inner molding surface 62 which together define the upper panel section of the bottle. The members 60A, 60B each have an upper cavity which receives a combined shoulder section 40A, 40B and neck plate 30A, 30B. The members 60A, 60B each have a lower cavity which receives a shim 80, lower panel section 100, base locator section 120, and bottom plate 130. The base member 16 includes an upper base plug 140 bolted to a base pedestal 150.

Figure 2:
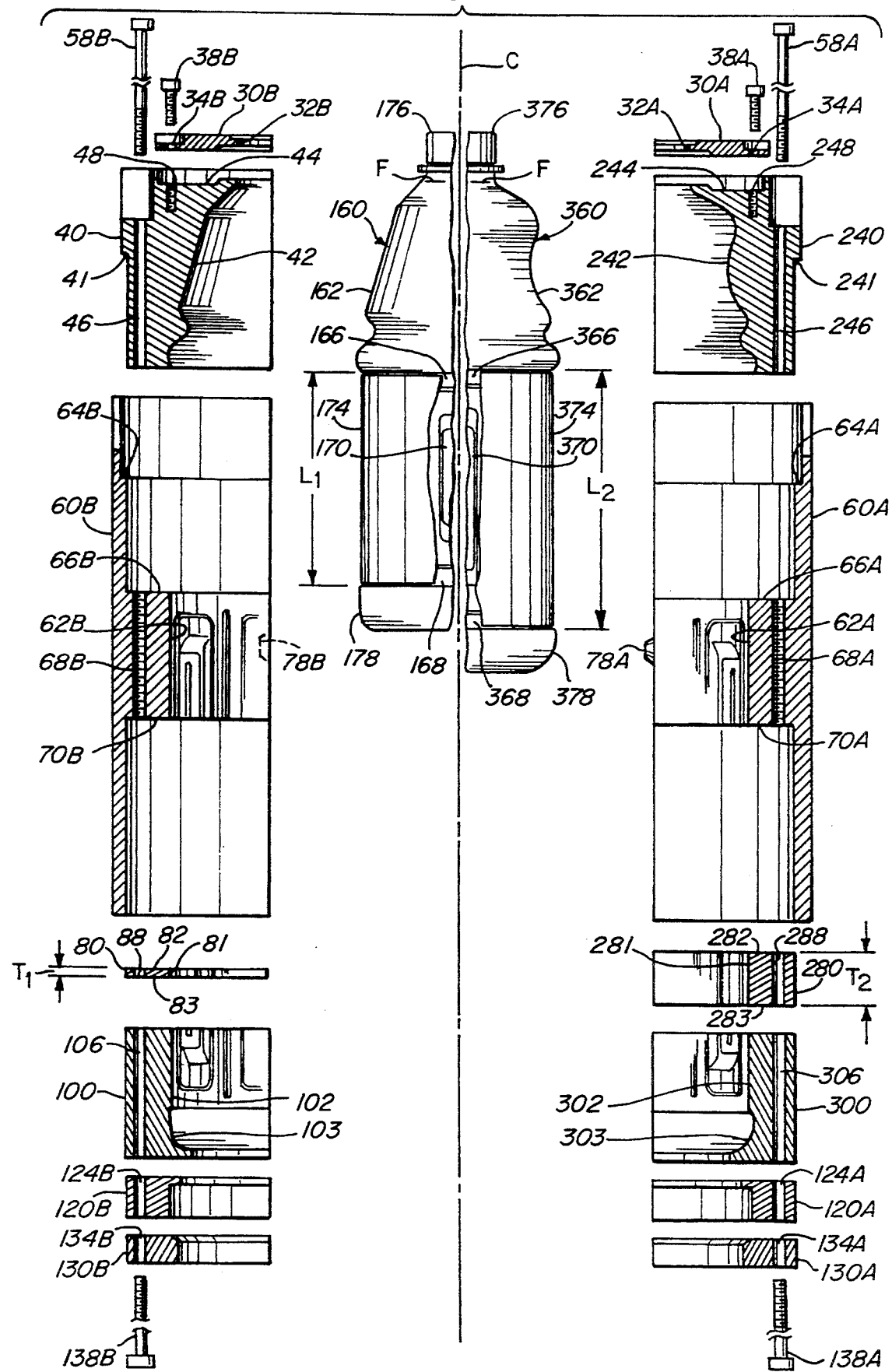
FIG. 2 is an exploded cross sectional view of the upper mold members, with two different shoulder and base shapes in the left and right halves and the corresponding bottle halves shown in the center.

FIG. 2 shows an exploded view of the left and right members to show how these mold members are assembled. FIG. 2 also shows two different mold halves on the left and right to illustrate how the insertion of different shoulder and lower panel sections and shims enables the production of two different bottles, the different bottle halves being disposed on opposite sides of the centerline in FIG. 2. The left half is the same as that shown in FIG. 1, while the right half is the same as FIG. 1, except for a different customized shoulder 240, shim 280, and lower panel 300.

With regard to assembly of the mold, FIG. 2 shows that neck plate 30 fits within a cavity 44 (244) in the top of shoulder 40 (240), and a bolt 38 passes through aligned bores 34, 48 (248) in the neck plate and shoulder to secure the same. The combined neck plate and shoulder fit within an upper cavity in upper panel section 60 defined by first step 64 which receives that portion of the shoulder above outer notch 41 (241) and a second step 66 which receives that portion of the shoulder below the notch. A bolt 58 passes through aligned apertures 46 (246) in the shoulder 40 (240) and apertures 68 in the central section 60 to secure the same. Similarly, the central section 60 has a lower cavity defined by a third step 70 which receives, in order from top to bottom, shim 80 (280), lower panel section 100 (300), base locator section 120, and bottom plate 130. A bolt 138 passes through aligned apertures 68, 88 (288), 106 (306), 124, and 134 in these sections respectively to secure the same to central member 60.

With regard to customizing the mold sections, neck plate 30 is the same on the left and right and has an inner surface 32 adapted to receive the lower neck flange of the parison 20. Shoulders 40 and 240 on the left and right respectively have differently shaped inner molding surfaces 42 and 242. The customized shoulder 162 of the left bottle 160 is straighter than shoulder 362 of the right bottle 360, as determined by the different molding surfaces 42 and 242 respectively. The upper panel molding surfaces 62 are the same, but because of differences in shoulder shape 42 (242) (and/or also in base shape 103 (303) as described hereinafter), different height or thickness shims 80 (280) are provided to vary the overall height or length of the label panel. Bottle 160 has a label panel of height $L_1$ covered by label 174, while bottle 360 has a greater label panel height $L_2$ covered by label 374. Left shim 80 has a height $T_1$, between top and bottom surfaces 82, 83, which is less than the height $T_2$ of right shim 280 between top and bottom surfaces 282, 283. The respective label panels are defined by the combined molding surfaces 62, 81 (281), and 102 (302) of the upper panel, shim and lower panel sections. The customized base 178 of the left bottle is less rounded than base 378 of the right bottle, as determined by the different molding surfaces 103 and 303 respectively. The bottles 160 (360) each receive a cap 176 (376) over the thread finish and have designated thereon for illustrative purposes the desired fill lines F for the hot-fill product.

Figure 3:
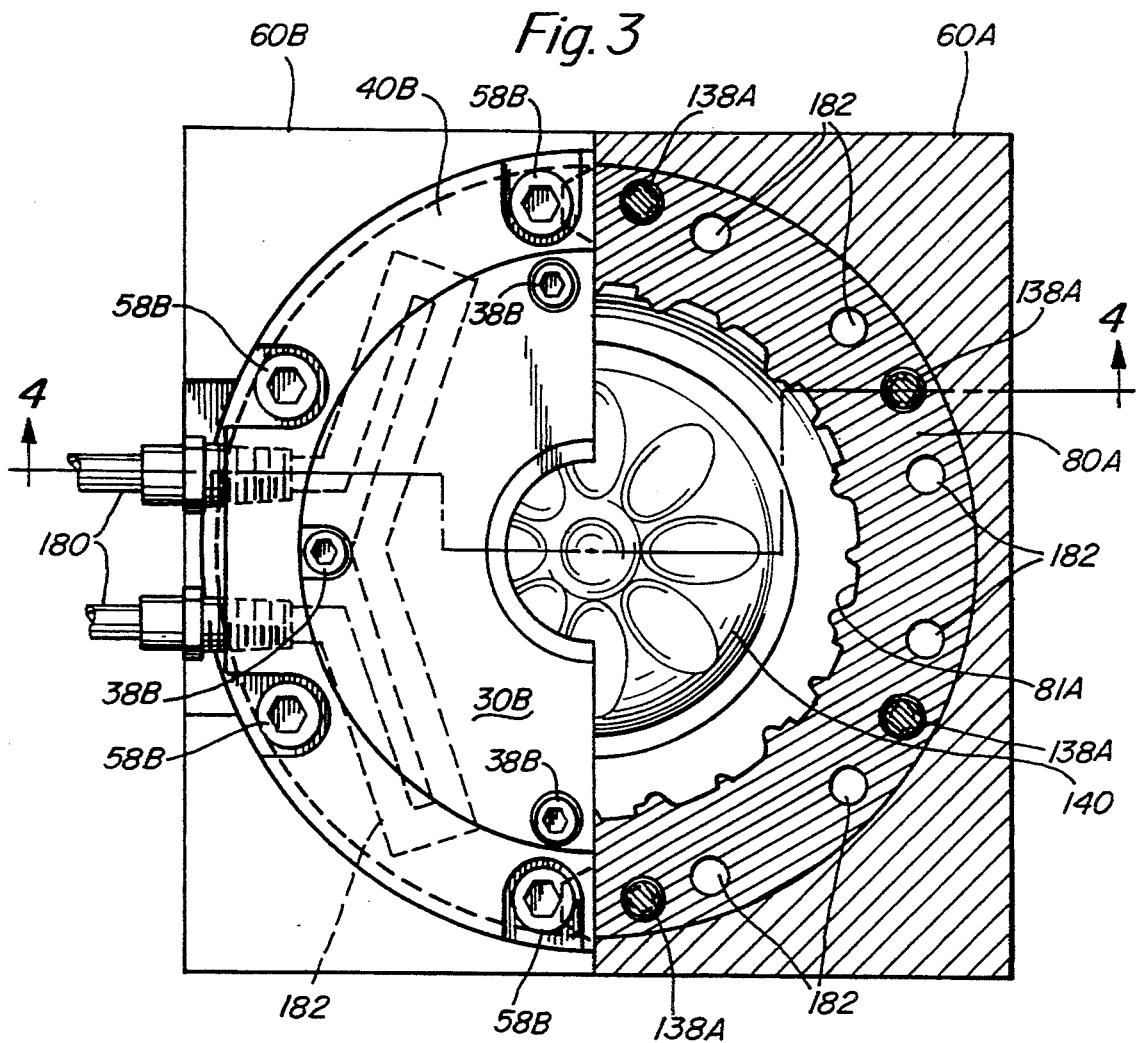
FIG. 3 is an upper plan view, partially in section, taken along the section lines 3—3 of FIG. 4.
Figure 4:
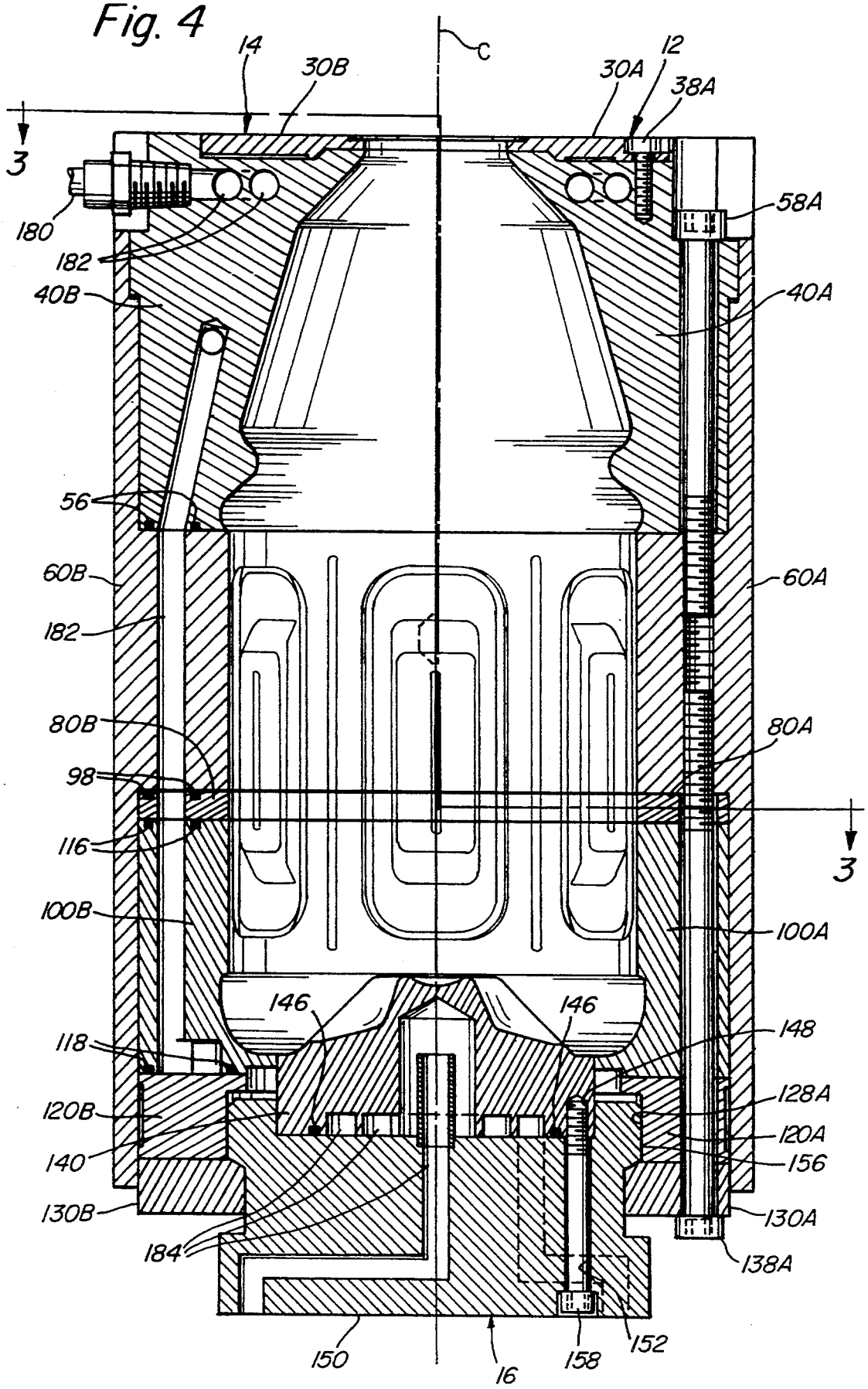
FIG. 4 is a side plan view in cross section showing the three mold members of FIG. 1 closed to form a complete mold set.

FIGS. 3 and 4 show top and side sectional views of the assembled mold of FIG. 1, wherein there are shown feed tubes 180 which supply a liquid cooling medium (e.g., water) to passages 182 in the upper mold halves 12, 14. O-rings are provided where the cooling passages pass from one mold section to another, and include a set 56 in the bottom of shoulder 40, a set 98 in the top of shim 80, a set 116 in the top of lower panel section 100, and a set 118 in the bottom of lower panel section 100. Also, FIG. 4 shows how unitary base member 16 fits between the upper mold halves 12, 14. Base 16 includes upper base plug 140 and lower pedestal 150, connected by bolt 158 which passes through aligned apertures 152, 148 in the pedestal and plug respectively. Liquid cooling passages 184 are provided, which include a spiral configuration between the plug and pedestal, and a set of O-rings 146 are likewise provided. Pedestal 150 has an upper enlarged diameter registration or retaining ring 156 which fits within a cylindrical cavity 128 in base locator section 120. FIG. 3 shows a top sectional view of shim half 80A, with bolts 138A passing therethrough for connection to the central member 60, cooling passages 182, and the inner molding surface 81A which defines a section of the vacuum panels.

While a preferred embodiment of the invention has hereinbefore been described, it will be appreciated that variations and equivalents thereof will be perceived by those skilled in the art, which are nevertheless within the scope of the invention as defined by the claims appended hereto.

We claim:

1. A mold assembly for forming a plastic blow-molded container having a panel portion with vacuum panels, the mold assembly comprising:
   an upper mold section having an upper molding surface shaped to form a shoulder and an upper vacuum panel portion of the container;
   a lower mold section having a lower molding surface shaped to form a lower vacuum panel portion and a base of the container; and
   at least one shim of predetermined height positioned between the upper and lower mold sections having a middle molding surface shaped to form a middle vacuum panel portion of the container, wherein the shims are replaceable in order to vary the overall height of the vacuum panels.

2. In a modular mold for making a plastic blow-molded container, the container having shoulder, panel and base portions and the panel portion including vacuum panels, the mold including a central connecting member having an inner molding surface for forming the panel portion of the container and which central connecting member receives customized shoulder and base sections from above and below respectively for forming the shoulder and base portions of the container, the improvement comprising:
   the central connecting member having an upper molding surface shaped to form an upper part of the vacuum panels; and
   at least one shim positioned below the central connecting member, and a lower panel section positioned below the shim, wherein the shim and lower panel section have lower molding surfaces shaped to form a lower part of the vacuum panels, wherein the height and number of shims can be adjusted to adjust the overall height of the vacuum panels.

3. A method for forming an adjustable volume plastic, blow-molded container having shoulder, panel and base portions, wherein the panel portion has vacuum panels, the method comprising:
   providing a central mold section having an upper molding surface for forming an upper panel portion of the plastic blow-molded container, the upper molding surface being shaped to form an upper part of the vacuum panels;
   providing upper and lower mold sections attached above and below the central mold section respectively, wherein the upper mold section has an inner molding surface for forming a shoulder portion of the container and the lower mold section has a lower molding surface for forming a lower panel portion and a base portion container, the lower molding surface being shaped to form a lower part of the vacuum panels;
   providing a plurality of shims, the shims having middle molding surfaces shaped to form a middle part of the vacuum panels;
   selecting one or more shims of a predetermined overall height and positioning the shims between the central and lower mold sections in order to vary the height of the vacuum panels; and
   blow-molding The container in the mold.

4. In a method of blow molding a plastic hot-fill container in a mold assembly of the type including a central mold section for forming at least part of a panel portion of the container, wherein the panel portion of the container has vacuum panels, and the mold assembly further has upper and lower mold sections positionable above and below the central mold section for forming a shoulder and base portion of the container respectively, the improvement comprising:
   providing a plurality of shims each having an inner molding surface for forming at least a part of the vacuum panels;
   providing the lower mold section with an inner molding surface for forming a lower panel portion;
   selecting shims of a predetermined overall height in order to vary the overall vacuum panel height, wherein a larger height is selected for a larger container in order to compensate for the greater vacuum contraction of the container during cooling.

* * * * *